United States Patent [19]

Long

[11] Patent Number: 5,238,053

[45] Date of Patent: Aug. 24, 1993

[54] METHOD OF AND SYSTEM FOR WARMING ROAD SURFACE

[76] Inventor: Erwin L. Long, 5741 College Dr., Anchorage, Ak. 99504

[21] Appl. No.: 863,443

[22] Filed: Apr. 3, 1992

[51] Int. Cl.$^5$ .......................... F23D 15/02; E02D 3/11
[52] U.S. Cl. ...................................... 165/45; 405/131; 165/104.21
[58] Field of Search .............. 165/45, 104.21; 62/260; 405/130, 131

[56] References Cited

U.S. PATENT DOCUMENTS

| | | | |
|---|---|---|---|
| 3,195,619 | 7/1965 | Tippmann | 165/45 |
| 3,217,791 | 11/1965 | Long | 165/45 |
| 3,976,125 | 8/1976 | Best | 165/45 |
| 4,050,509 | 9/1977 | Bienert et al. | 165/45 |
| 4,162,394 | 7/1979 | Faccini . | |

FOREIGN PATENT DOCUMENTS

| | | | |
|---|---|---|---|
| 1578435 | 7/1990 | U.S.S.R. | 165/45 |
| 1359378 | 7/1974 | United Kingdom | 165/45 |

Primary Examiner—Albert W. Davis, Jr.
Attorney, Agent, or Firm—Heller, Ehrman, White & McAuliffe

[57] ABSTRACT

A road surface is warmed by means of a two-phase thermosyphon with an easily vaporizable liquid partially filling a sealed container. A portion of the container serves as a condenser and another portion as an evaporator. If at least a portion of the evaporator is above the boiling point of the liquid, the liquid will boil and the vapor will rise into the condenser part of the thermosyphon, and if the condenser part is in an environment below the condensing temperature of the vapor, the vapor will condense, thereby radiating heat and warming the surrounding environment. The condenser is elongated and installed underground so as to lie closely beneath the road surface. A thermally insulating layer is provided below the condenser part so as to more efficiently utilize the radiated heat. The evaporator may be of a double-tube structure such that the liquid can flow through the entire length thereof even if these tubes include rising and falling sections. A plurality of such thermosyphons and the insulating layer may be used together as a prefabricated panel.

17 Claims, 3 Drawing Sheets

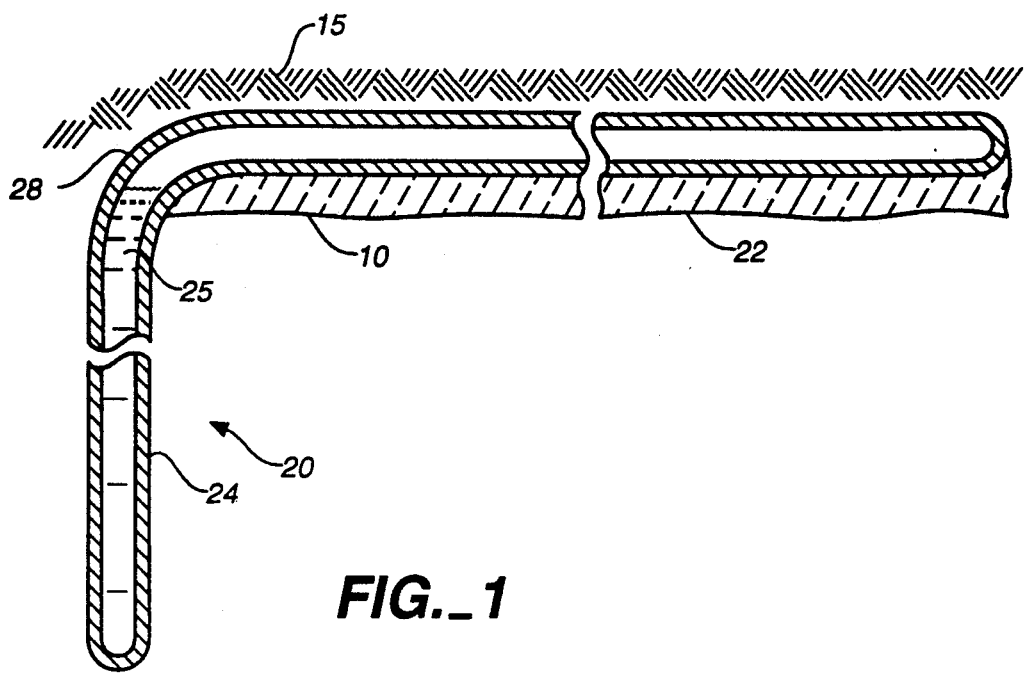
FIG._1
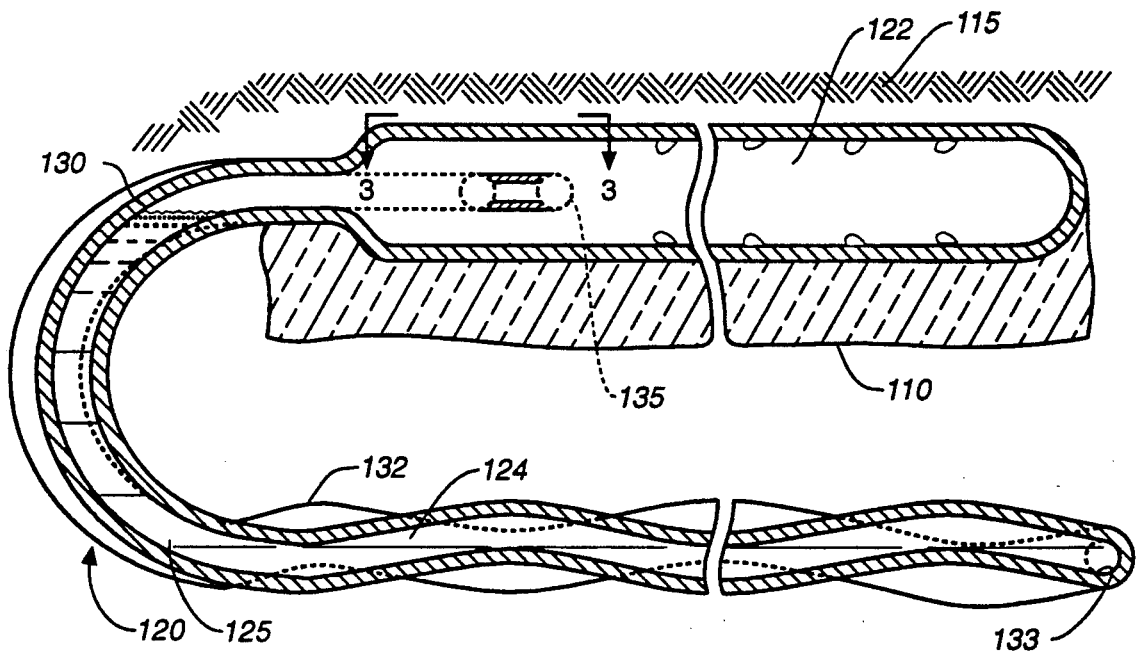
FIG._2

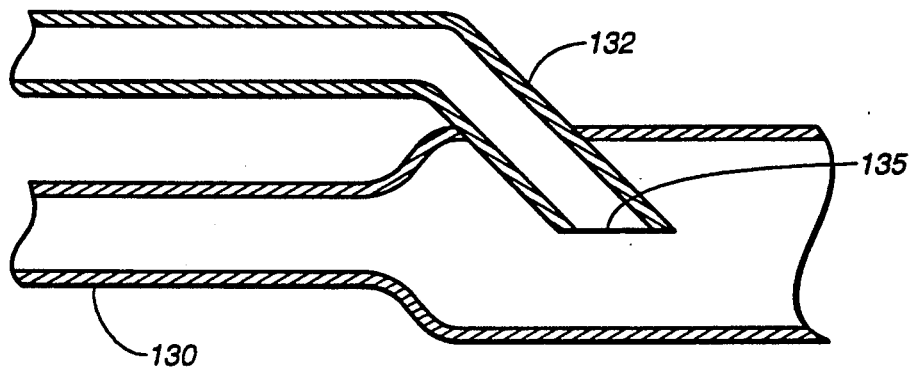
FIG._3
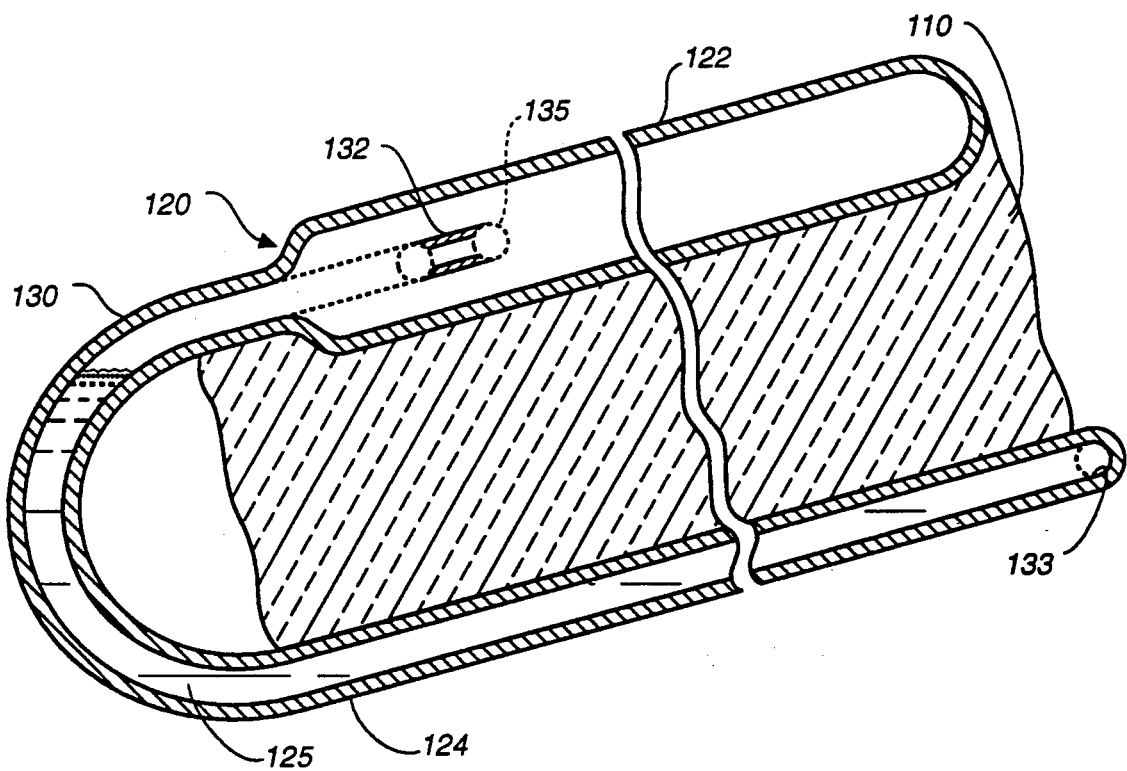
FIG._5

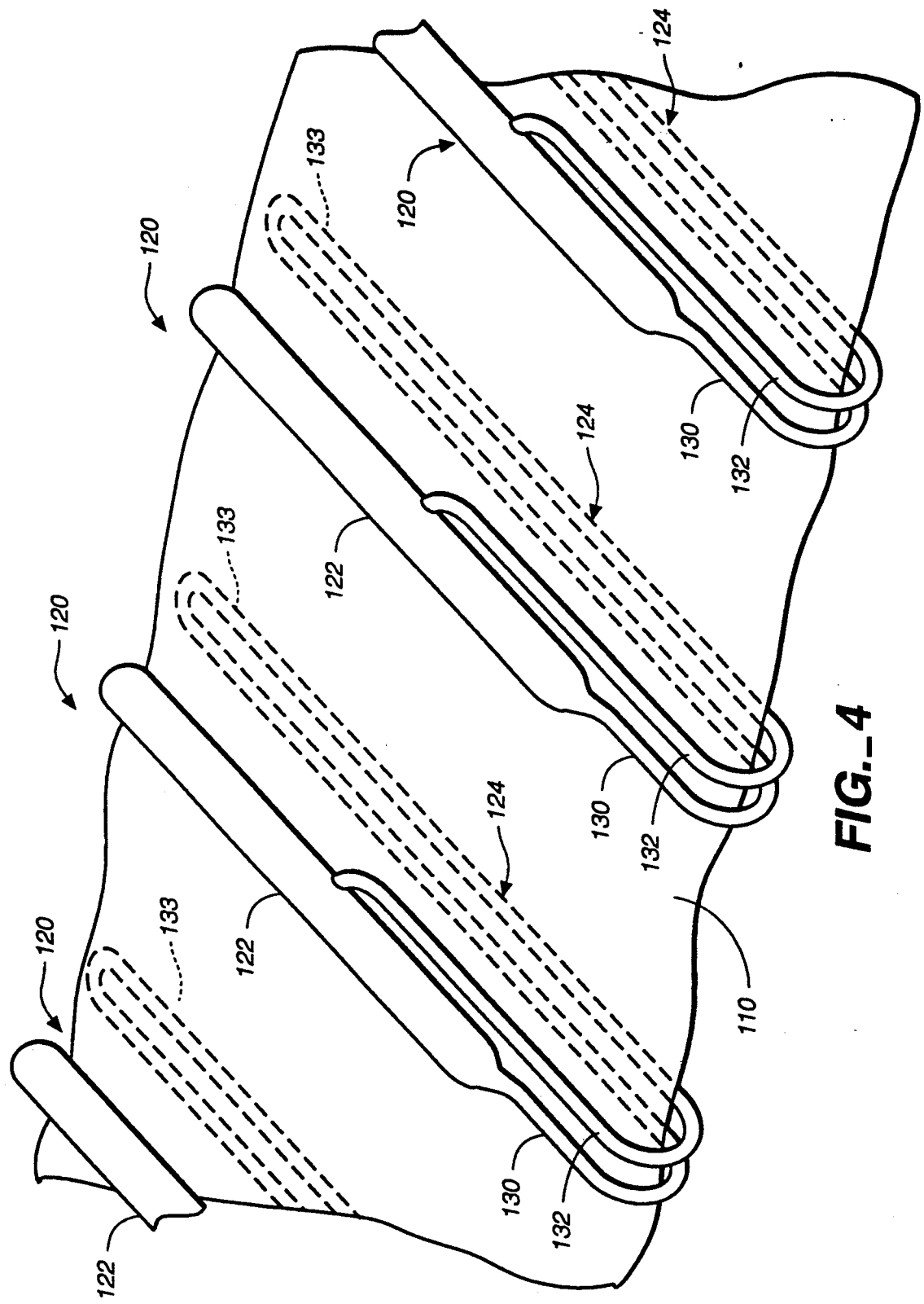
FIG._4

METHOD OF AND SYSTEM FOR WARMING ROAD SURFACE

BACKGROUND OF THE INVENTION

This invention relates to the technology of warming road surfaces such as surface areas of highways, runways, sidewalks and parking lots.

The colder a road surface area is, the more susceptible it is to water vapor condensation and icing of the surface and the harder it is to remove snow and ice from the surface. The use of insulation to reduce thawing of permafrost or to reduce seasonal freezing of highly frost susceptible soils further lowers the surface temperature and further aggravates surface icing.

It is therefore an object of the present invention to provide efficient and inexpensive methods and systems for warming road surfaces such as surface areas of highways, runways, sidewalks and parking lots.

SUMMARY OF THE INVENTION

According to this invention, a road surface is warmed by means of a two-phase thermosyphon using an easily vaporizable liquid inside, and partially filling, a sealed container. A portion of the container serves as a condenser and another portion as an evaporator. If at least a portion of the evaporator is above the boiling point of the liquid, the liquid will boil and the vapor will rise into the condenser part of the thermosyphon. If the condenser part is in an environment below the condensing temperature of the vapor, the vapor will condense, thereby radiating heat and warming the surrounding environment.

In order to efficiently heat a road surface, the condenser part of a thermosyphon according to the present invention is elongated and installed underground so as to lie closely beneath the road surface. A thermally insulating layer is provided below the condenser part so as to more efficiently utilize the radiated heat. The evaporator part is elongated and installed so as to allow the condensate liquid to flow its full length and to thereby provide a wetted surface therealong. For this purpose, the evaporator may be installed substantially vertically or may be of a double-tube structure with a supply tube and a return tube connected to and opening into each other at a distal end point away from the condenser part. The other end portion of the return tube, proximal to the condenser part, opens inside the supply tube and has a much smaller cross-sectional area than an annular area around it. Thus, if the liquid begins to boil and forms bubbles in the evaporator part, the condensate liquid will circulate, flowing from the supply tube into the return tube. The end opening of the return tube is kept sufficiently high above the rest of the evaporator part such that a wetted surface can be provided throughout the evaporator part due to the difference in hydrostatic pressure in the tubes.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic sectional side view of a road surface warming system embodying the present invention;

FIG. 2 is a schematic sectional side view of another road surface warming system embodying the present invention;

FIG. 3 is a plan view of a portion of the thermosyphon of FIG. 2 taken along the line 3—3 therein;

FIG. 4 is a schematic perspective view of a portion of still another road surface warming system embodying the present invention; and FIG. 5 is a sectional side view of one of the thermosyphons of the system shown in FIG. 4.

DETAILED DESCRIPTION OF THE INVENTION

As schematically shown in FIG. 1, a system for warming a road surface according to the present invention essentially consists of an insulating layer 10 and a thermosyphon 20. The insulating layer 10 is prepared underground below a road surface 15 to be warmed and may be formed with a thermally insulating material such as styrofoam. The thermosyphon 20 is essentially an elongated tubular container having a condenser part 22 and an evaporator part 24. An easily vaporizable liquid 25 is sealed inside and partially fills the container. The condenser part 22 is at one end of the tubular container and is itself tubular and elongated. The thermosyphon 20 is installed such that the condenser part 22 will lie closely beneath the road surface 15, above the insulating layer 10 and slightly inclined such that, when vapor of the liquid 25 condenses inside the condenser part 22, the condensate liquid can flow into the evaporator part 24.

The evaporator part 24 is also tubular and extends vertically or substantially vertically downward from the condenser part 22. Numeral 28 indicates a bend, that is, a part of the container between the nearly horizontal section leading to the condenser part 22 and the substantially vertical evaporator part 24. The bend 28 may be pre-fabricated or may be formed by bending the tubular material of the thermosyphon 20 after the placement of the insulating layer 10 and/or soil.

In a system thus prepared, the liquid 25 begins to boil if any portion of the evaporator part 24 reaches a temperature above its boiling point, vapor migration takes place into the condenser part 22 above the insulating layer 10 where the temperature may be below the condensation temperature of the liquid 25. As the vapor condenses in such an environment, heat is radiated therefrom into the ground surrounding the condenser part 22. Because of the insulating layer 10 lying below the condenser part 22, the radiated heat serves mostly to warm the road surface 15. The condensed liquid 25 travels down on the inner wall of the condenser part 22 and returns to the evaporator part 24.

A system as shown in FIG. 1 can produce a great surface warming effect if the evaporator part 24 exceeds the length of the condenser part 22. If the system is installed in a permafrost foundation, such a system can provide a high degree of its stabilization. In non-permafrost areas, it can provide more heat to the surface without causing detrimental frost heave of frost-susceptible subgrade.

FIG. 2 shows another surface warming system embodying the present invention which is similar to the one described above with reference to FIG. 1 in that it, too, substantially consists of a thermally insulating layer 110 prepared underground below a road surface 115 to be warmed and a thermosyphon 120 having a condenser part 122 and an evaporator part 124 and containing an easily vaporizable liquid 125 sealed therein. The condenser part 122 at one end of the tubular container is installed so as to lie closely beneath the road surface 115, above the insulating layer 110 and slightly inclined. The evaporator part 124, in contrast to its counterpart shown at 24 in FIG. 1, not only extends substantially horizontally below the insulating layer 110 but also is of double-tube structure with a supply tube 130 and a return tube 132 which are connected together and open to each other at a distal point 133 away from the condenser part 122 such that the liquid 125 can freely flow from one to the other of these tubes. As shown more clearly in FIG. 3, the other end of the return tube 132, proximal to the condenser part 122, has an opening 135 inside the supply tube 130. The cross-sectional area of the return tube 132 near the opening 135 is significantly less than that of the supply tube 130 therearound. The liquid 125 fills the supply tube 130 and the return tube 132 partially such that its top surface is slightly below the opening 135 when it is not boiling. The liquid 125 may begin to boil, as explained above with reference to FIG. 1, if any portion of the evaporator part 124 is subjected to a temperature which is relatively warm with respect to the environment surrounding the condenser part 122. As bubbles are formed, the level of the liquid 125 rises inside both the supply tube 130 and the return tube 132, but since the cross-sectional area of the return tube 132 is much smaller than the annular area defined between the supply and return tubes 130 and 132, the density of the liquid-vapor mixture is much less inside than outside the return tube 132. As a result, the liquid 125 inside the return tube 132 rises faster, spills over through the opening 135 and keeps spilling into the supply tube 130, causing the liquid 125 to flow from the supply tube 130 into the return tube 132 through the distal point 133 at which they are joined together. The greater the flow rate through the evaporator part 130, the greater the difference in the hydrostatic pressure between the tubes 130 and 132.

The vapor, which moves up inside the inclined condenser part 122, is condensed upon exposure to relatively colder temperatures below its condensation temperature, thereby radiating heat of condensation to the environment, that is, the layer immediately below the road surface 115 to be warmed. In the meantime, the condensed liquid drains from the condenser part 122 back into the evaporator part 122, thereby starting a new heat exchange cycle.

When the thermosyphon 120 of FIG. 2 is installed, the evaporator part 124 need not be exactly horizontal. Its supply and return tubes 130 and 132 may include both rising and falling sections below the insulating layer 110, but it is important to ascertain that the opening 135 on the return tube 132 be sufficiently higher than the highest point in the evaporator part 124 below the insulating layer 110 such that the hydrostatic pressure caused by this differential fluid level exceeds the dynamic pressure caused by resistance against flow of the liquid 125 through the evaporator part 124. Care must also be taken so as to prevent vapor locking of the system high points by properly taking into account the tube diameter, liquid viscosity, surface tension and slug flow of the liquid portions.

Still another road surface warming system embodying the present invention is shown in FIGS. 4 and 5 wherein components which are at least similar to and function substantially identically to those shown in FIGS. 2 and 3 are indicated by the same numerals.

The system shown in FIGS. 4 and 5 may be characterized as having a plurality of thermosyphons 120 aligned substantially parallel to one another and having an insulating layer 110 between their condenser and evaporator parts so as to together form a panel. Each thermosyphon 120 is of double-tube type configuration of prefabricated construction with its evaporator part 124 having a supply tube 130 and a return tube 132 joined together at a distal point 133 away from its condenser part 122. The condenser part 122 and the evaporator part 124 are substantially parallel to each other, sandwiching the insulating layer 110 in between. When the complete panel is installed, the condenser part 122 is slightly inclined, parallel to and closely beneath a road surface 115, lying above the evaporator part 124 such that the liquid level inside the thermosyphon 120 is sufficiently higher than any part of the evaporator part 124. This is necessary because a wetted surface must be provided throughout the evaporator part 124 when the liquid begins to boil and bubbles are formed inside the tubes such that the liquid 125 inside the evaporator part 124 can flow from the supply tube 130 to the return tube 132 through the distal point 133 due to the difference in hydrostatic pressure in these tubes. In general, care must be taken such that this differential fluid level be sufficiently large such that the hydrostatic pressure caused thereby be sure to exceed the dynamic pressure caused by resistance against flow of the liquid 125 through the system. Care must also be taken so as to prevent vapor locking of the system high points by properly taking into consideration the tube diameter, liquid viscosity, surface tension and slug flow of the liquid portions.

For an in-ground condensation system to operate, a reasonable thermal resistance of R-4 or greater must exist between the evaporator and condenser parts, the R-factor being defined as the inverse of the thermal conductivity of the total thickness. The smaller the temperature differential between the two parts, the greater is the R-value required to operate the system efficiently and effectively. In permafrost areas where super-cooling of the permafrost is as important as warming the surface, a unit thermal resistance of RT-16 (or thermal conductivity of about 0.06 BTU·in/hr·ft$^2$·°F.) to R-32 (or thermal conductivity of about 0.03 BTU·in/hr·ft$^2$·°F.) would be used.

The insulating layer 110 is preferably of closed cell type without an opening between adjacent cells, having very low permeability with added vapor-resistant surfaces on top and bottom to resist moisture accumulation within the insulation.

The invention has been described above by way of only a few examples, but these examples are intended to be interpreted broadly and not as limiting the scope of the invention. Many modifications and variations are possible within the scope of the invention. For example, the evaporator may include both rising and failing sections as long as the tubes are installed such that the hydrostatic pressure inside them is such that the liquid can flow from the supply tube to the return tube when the liquid begins to boil and bubbles are beginning to be formed. The drawings are mostly intended to be schematic, and are not to be interpreted as disclosing preferred shapes of, or positional relationship among, the various components. All modifications and variations that may be apparent to a person skilled in the art are intended to be considered within the scope of this invention.

I claim:

1. A method of warming a road surface, said method comprising the steps of:
   providing a substantially horizontal thermally insulating layer underground below said road surface;
   providing a thermosyphon with an easily vaporizable liquid inside a sealed container having a condenser part and an evaporator part; and
   installing said thermosyphon underground such that said condenser part lies closely beneath said road surface and above said insulating layer, and that said evaporator part is buried deeper underground below said insulating layer.

2. The method of claim 1 wherein at least a portion of said evaporator part is subjected to a temperature above the boiling point of said liquid.

3. The method of claim 2 wherein said evaporator part is elongated and is installed substantially horizontally below said insulating layer.

4. The method of claim 2 wherein said evaporator part includes a supply tube and a return tube, said tubes having a rising end section proximal to said condenser part and a laterally extending section, said laterally extending section extending laterally from said rising end section to a distal point, said tubes being in mutually liquid-communicating relationship at said distal point, said rising end section of said return tube having an opening, being inside said supply tube and having a substantially smaller cross-sectional area than said supply tube at said vertically extending section, said opening being sufficiently higher than said laterally extending part of said tubes such that the hydrostatic pressure inside said tubes causes said liquid to flow from said return tube through said distal point into said supply tube when said liquid boils inside said evaporator part.

5. The method of claim 4 wherein said laterally extending section is installed substantially horizontally.

6. The method of claim 4 wherein said laterally extending section is allowed to include both positively and negatively sloped sections.

7. The method of claim 4 wherein said thermosyphon is one of a plurality of similarly structured thermosyphons, said plurality of thermosyphons having said insulating layer sandwiched between condenser and evaporator parts thereof.

8. The method of claim 7 wherein said condenser part and the laterally extending part of said evaporator are substantially parallel to each other.

9. A system for warming a road surface, comprising:
   a substantially horizontal thermally insulating layer below said road surface, and
   a thermosyphon with an easily vaporizable liquid inside a sealed container having a condenser part and an evaporator part, said condenser part being elongated and installed closely beneath said road surface and above said insulating layer, said evaporator part being elongated and extending from said condenser part below said insulating layer to a distal end point such that said evaporator has at least a portion having temperature above the boiling point of said liquid.

10. The system of claim 9 wherein said condenser part is in an environment where temperature goes below the condensation temperature of said liquid.

11. The system of claim 9 wherein said evaporator part includes a substantially horizontally extended section.

12. The system of claim 9 wherein said evaporator part includes a supply tube and a return tube, said tubes having a rising end section proximal to said condenser part and a laterally extending section, said laterally extending section extending laterally from said rising end section to a distal point, said tubes being in mutually liquid-communicating relationship at said distal point, said rising end section of said return tube having an opening, being inside said supply tube and having a substantially smaller cross-sectional area than said supply tube near said opening, said opening being sufficiently higher than said laterally extending part of said tubes such that the hydrostatic pressure inside said tubes causes said liquid to flow from said return tube through said distal point into said supply tube when said liquid boils inside said evaporator part.

13. The system of claim 12 wherein said laterally extending section is substantially horizontal.

14. The system of claim 12 wherein said laterally extending section includes both positively and negatively sloped sections.

15. The system of claim 12 wherein said thermosyphon is one of a plurality of similarly structured thermosyphons, said plurality of thermosyphons having said insulating layer sandwiched between condenser and evaporator parts thereof.

16. The system of claim 12 wherein said condenser part and the laterally extending part of said evaporator are substantially parallel to each other.

17. The system of claim 12 wherein said plurality of thermosyphons and said insulating layer are prefabricated so as to form a panel.

* * * * *